(12) United States Patent
Caceres et al.

(10) Patent No.: US 10,069,822 B2
(45) Date of Patent: Sep. 4, 2018

(54) AUTHENTICATED NETWORK TIME FOR MOBILE DEVICE SMART CARDS

(71) Applicant: Verizon Patent and Licensing Inc., Arlington, VA (US)

(72) Inventors: Manuel Enrique Caceres, Basking Ridge, NJ (US); Warren Hojilla Uy, Randolph, NJ (US); Praveen Venkataramu, Bridgewater, NJ (US); Ruben Cuadrat, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 15/050,544

(22) Filed: Feb. 23, 2016

(65) Prior Publication Data
US 2017/0244697 A1    Aug. 24, 2017

(51) Int. Cl.
*H04L 29/06*    (2006.01)

(52) U.S. Cl.
CPC ...... *H04L 63/0853* (2013.01); *H04L 63/0435* (2013.01); *H04L 63/0807* (2013.01); *H04L 63/0823* (2013.01); *H04L 63/0876* (2013.01)

(58) Field of Classification Search
USPC ........................................................ 713/156
See application file for complete search history.

(56) References Cited

U.S. PATENT DOCUMENTS

| | | | | |
|---|---|---|---|---|
| 5,596,641 A | * | 1/1997 | Ohashi | H04L 9/3271 380/248 |
| 7,424,741 B1 | * | 9/2008 | Grimm | H04L 63/1458 726/13 |
| 8,064,602 B2 | * | 11/2011 | Paddon | H04W 12/04 380/247 |
| 9,742,745 B2 | * | 8/2017 | Potonniee | H04L 63/06 |
| 2004/0127238 A1 | * | 7/2004 | Bianconi | H04W 4/14 455/466 |
| 2007/0162741 A1 | * | 7/2007 | Kasaura | H04L 63/0823 713/156 |
| 2007/0198848 A1 | * | 8/2007 | Bjorn | G06F 21/35 713/186 |
| 2009/0187983 A1 | * | 7/2009 | Zerfos | H04L 63/0823 726/10 |
| 2011/0040972 A1 | * | 2/2011 | Attia | H04L 9/321 713/168 |
| 2012/0045060 A1 | * | 2/2012 | Maestrini | H04L 63/08 380/274 |

(Continued)

*Primary Examiner* — Taghi Arani
*Assistant Examiner* — Badri Champakesan (57) ABSTRACT

A mobile device sends a network attach request to a network node, and receives an authentication challenge from the network node, where the authentication challenge includes an authentication token, a random number, and a time variable associated with a current time at the network node. A microprocessor smart card of the mobile device retrieves the time variable from the authentication challenge, and starts a clock counter based on the retrieved time variable. The microprocessor smart card uses a current time represented by the clock counter to perform time expiration validation tests on certificates during Public Key Infrastructure (PKI) authentication or on authentication tokens during token-based authentication.

20 Claims, 9 Drawing Sheets

(56) References Cited

U.S. PATENT DOCUMENTS

| | | | |
|---|---|---|---|
| 2014/0040991 A1* | 2/2014 | Potonniee | H04L 63/08 726/4 |
| 2014/0344910 A1* | 11/2014 | Kim | H04L 63/0823 726/8 |
| 2015/0007262 A1* | 1/2015 | Aissi | G06F 21/60 726/2 |
| 2015/0095648 A1* | 4/2015 | Nix | H04W 4/70 713/170 |
| 2015/0150088 A1* | 5/2015 | Haga | H04L 12/28 726/3 |

* cited by examiner

AUTHENTICATED NETWORK TIME FOR MOBILE DEVICE SMART CARDS

BACKGROUND

Smart cards typically consist of pocket-sized, or smaller, cards with embedded integrated circuits. Memory cards and microprocessor cards are two categories of smart cards. Memory cards contain only non-volatile memory storage components. Microprocessor cards contain memory storage components and microprocessor components. Microprocessor smart cards are typically used with mobile devices, such as cellular telephones, and have both limited memory capacity and processing power relative to the memory and microprocessor contained in the mobile devices into which the smart cards are inserted.

Subscriber Identity Module (SIM), Universal Integrated Circuit Cards (UICCs), and Removable User Identity Module (R-UIM) cards are examples of microprocessor smart cards. SIM cards securely store an identifier or key used to identify a subscriber on mobile telephone devices (e.g., cellular radiotelephones). SIM cards enable users to change phones by removing the SIM card from one telephony device and inserting it into another telephony device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS devices.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Microprocessor smart cards, such as, for example, UICCs, store security information in the form of encryption keys, where such encryption keys may be symmetric or asymmetric encryption keys. These keys, through the use of standardized algorithms, permit authentication of the mobile devices associated with the UICCs during network attach of the mobile devices to the desired network. Microprocessor smart cards, when implementing such standardized authentication algorithms typically work merely as storage mediums, with no concept of time since the smart cards do not maintain an internal clock, or have a battery to hold a time-based state. Microprocessor smart cards typically obtain a current time through query commands to the mobile device's modem such that the current time gets reset whenever the modem or the smart card powers down. The current time computed by the modem can be incorrect, leading to a wrong time being provided to the smart card, resulting in erroneous operations of any time-based operations performed by the microprocessor smart card. Therefore, to perform time-based operations at the microprocessor smart card, the smart card must receive an accurate network time directly from the network rather than getting it from the mobile device's modem.

In the embedded UICC (eUICC) project, the UICC smart card will need to be able to verify network elements through the use of Public Key Infrastructure (PKI) authentication algorithms. PKI authentication algorithms require the smart card to be able to perform cryptographic operations to perform the authentications including, for example, performing time expiration validation tests on PKI certificates during authentication. Thus, if the smart card does not have an accurate and trusted current time, it will not be able to perform PKI authentication functions properly. Microprocessor smart cards may additionally perform token-based authentication algorithms. The tokens used during such algorithms need to be protected against replay attacks, which requires the smart card to have knowledge of accurate time information. Existing authentication algorithms do not include accurate time information, but merely use a sequencing and synchronization process for protecting the authentication process against replay attacks. These existing sequencing and synchronization processes are inadequate for use in a PKI or asymmetric cryptographic environment.

Figure 1:
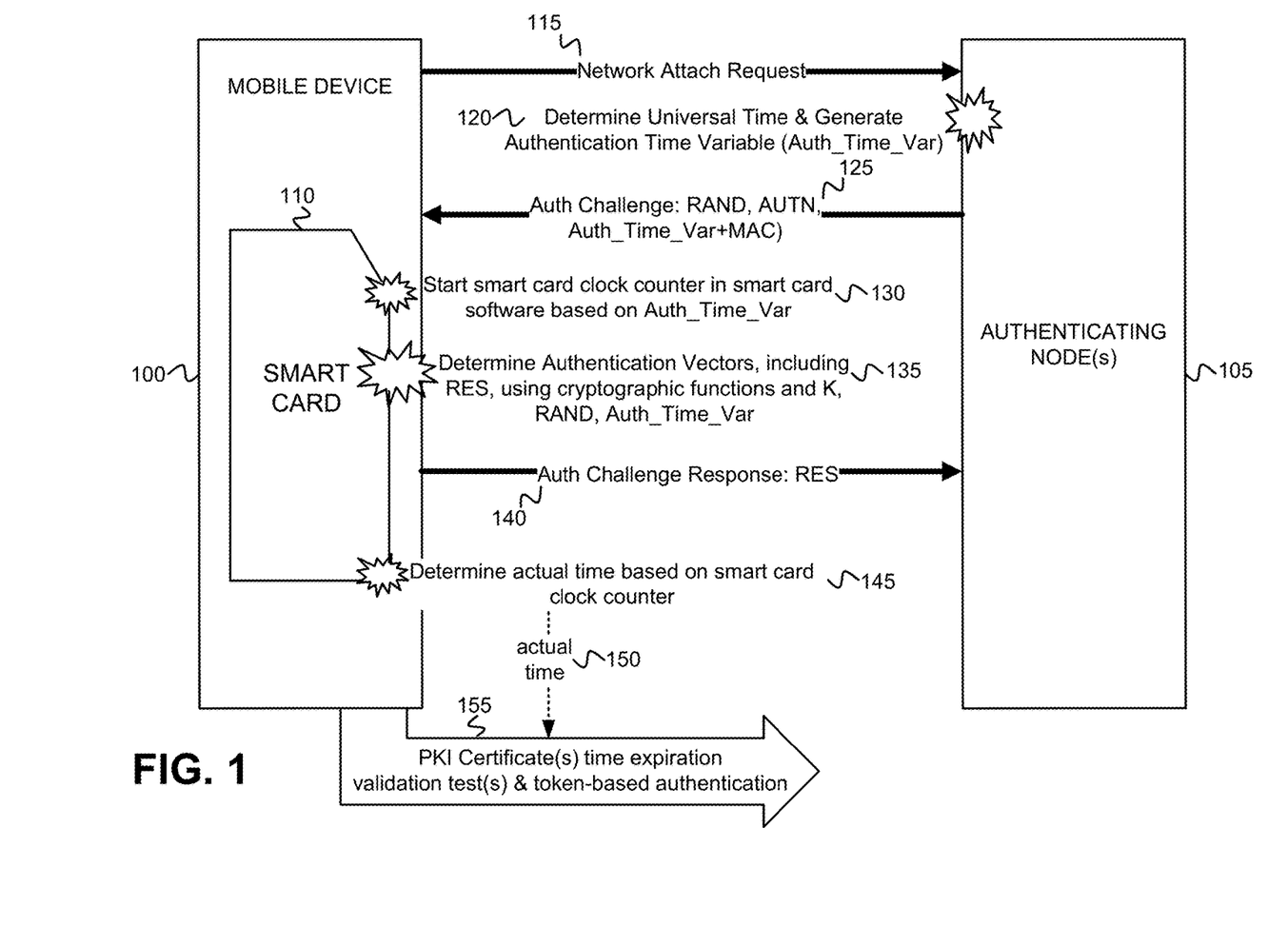
FIG. 1 is a diagram that depicts an overview of the receipt, at a microprocessor smart card at a mobile device from a node in the network involved in authenticating the mobile device's attachment to the network, of a time variable that is indicative of a current network time and use of that time variable at the smart card for locally keeping track of time.

FIG. 1 is a diagram that depicts an overview of the receipt, at a microprocessor smart card of a mobile device from a node in the network involved in authenticating the mobile device's attachment to the network, a time variable that is indicative of a current network time and use of that time variable at the smart card for locally keeping track of time. As shown in FIG. 1, mobile device 100 may send a network attach request 115 to an authenticating node(s) 105 for the network requesting a connection with the network. The network attach request 115 may, for example, be initiated based on a power up of mobile device 100 from a powered down state. In an exemplary implementation in which the network includes a Long Term Evolution (LTE) cellular network, the authenticating node(s) 105 may include, for example, a Home Subscriber Server (HSS).

Upon receipt of network attach request 115 from mobile device 100, the authenticating node(s) 105 may determine 120 a universal time and may generate an authentication time variable (Auth_Time_Var) based on the determined universal time. The universal time may be in the format of Hour:Minutes:Seconds. The authenticating node(s) 105 may additionally use cryptographic functions to determine other authentication parameters that are used in an authentication process, such as, for example, a random number (RAND), an authentication token (AUTN), and a Message Authentication Code (MAC). Authenticating node(s) 105 may send an authentication challenge 125 to mobile device 100. The authentication challenge 125 may include the random number (RAND), the authentication token (AUTN), the authentication time variable (Auth_Time_Var), and the Message Authentication Code (MAC).

When auth challenge 125 is received from authenticating node(s) 105, a smart card 110 of mobile device 100 starts 130 a clock counter in smart card software based on the authentication time variable (Auth_Time_Var). Smart card 110 then determines 135 various authentication values or keys, including a challenge response value (RES), using cryptographic functions and a security key (K), the received random number (RAND), and the received authentication time variable (Auth_Time_Var). Smart card 110 of mobile device 100 returns an authentication challenge response 140, which includes the challenge response value (RES), to authenticating node(s) 105. Smart card 110 determines 145 an actual time 150 based on the smart card clock counter and uses the actual time 150 during a subsequent PKI certificate(s) time expiration validation test(s) and token-based authentication.

Figure 2:
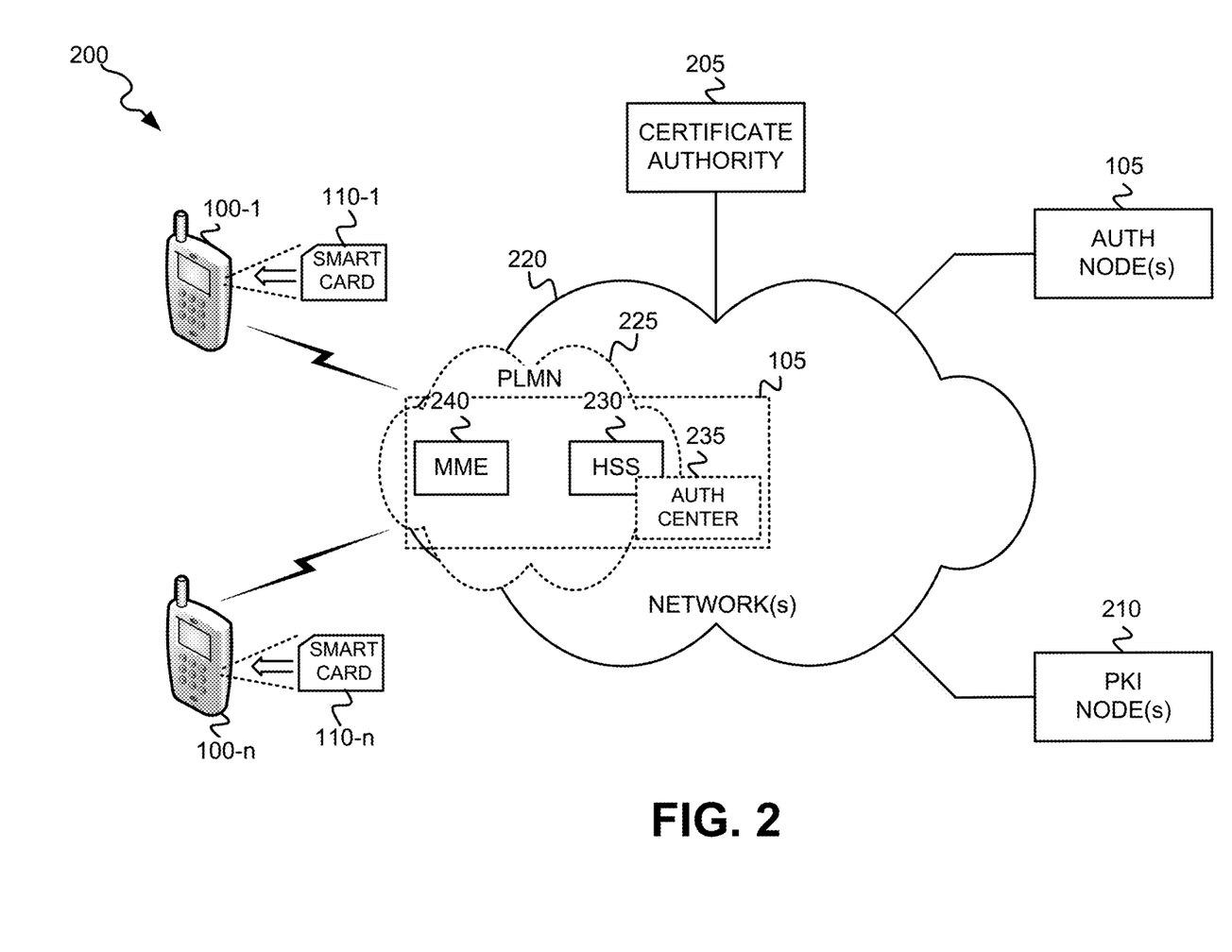
FIG. 2 is a diagram that depicts an exemplary network environment in which the mobile device authentication and the network authenticated time variable delivery, shown in FIG. 1, may be implemented.

FIG. 2 is a diagram that depicts an exemplary network environment 200 in which the mobile device authentication and the network authenticated time variable delivery, shown in FIG. 1, may be implemented. Network environment 200 includes mobile devices 100-1 through 100-*n*, where n is greater than or equal to one (generically referred to herein as "mobile device 100" or "mobile devices 100"), authenticating node(s) 105, PKI certificate authority 205 (referred to herein as "certificate authority 205"), PKI node(s) 210, and network(s) 220.

Mobile devices 100 each include an electronic device that includes an interface for inserting a respective one of microprocessor smart cards 110-1 through 110-*n* (generically referred to herein as "smart card 110" or "smart cards 110"), and which further includes a wireless interface for communicating via network 220. Mobile device 105 may include, for example, a cellular radiotelephone, a smart phone, a personal digital assistant (PDA), a palmtop or tablet computer, or a media player. Mobile device 105 may, however, include any type of electronic device that may include a smart card 110 and a wireless interface.

Microprocessor smart card 110 includes any type of microprocessor smart card capable of being inserted in mobile device 100 and that stores and processes data according to the exemplary process described in further detail below. Smart card 110 may, for example, include a small microprocessor card embedded with memory storage components and microprocessor components. Smart card 110 may include a Subscriber Identity Module (SIM), a Universal Integrated Circuit Card (UICC), or a Removable User Identity Module (R-UIM) card. SIM cards securely store an identifier (e.g., MDN) and/or key used to identify a subscriber on mobile telephone devices (e.g., cellular radiotelephones). SIM cards enable users to change phones by removing the SIM card from one telephony device and inserting it into another telephony device. UICCs are smart cards used in mobile devices in, for example, Global System for Mobile Communications (GSM) networks, Universal Mobile Telecommunications System (UMTS) networks (e.g., Universal Subscriber Identity Modules (USIMs)), and Internet Protocol (IP) Multimedia Subsystem (IMS) networks (e.g., Internet Protocol Multimedia Services Identity Modules (ISIMs)). UICCs ensure the integrity and security of different types of personal data, and may include several applications that permit access to both GSM and UMTS networks. R-UIMs include cards having features that are usable with Code Division Multiple Access (CDMA), GSM and UMTS devices. Other types of microprocessor smart cards, not described herein, may be used for smart card 110.

Certificate authority 205 includes one or more network devices that act as a node in a Public Key Infrastructure (PKI) system for generating and issuing a digital identity certificate requested by a mobile device 100. Authenticating node(s) 105 includes one or more network devices that verify the identity of a user of mobile device 100 and that issue authentication challenges to mobile device 100 (e.g., Authentication and Key Agreement (AKA) challenges).

PKI node(s) 210 includes one or more other nodes of the PKI system that, in conjunction with certificate authority 205, bind user public keys with respective user identities and assist in the creation, management, distribution, storage and revocation of digital identity certificates. PKI node(s) 230 may include, for example, a registration authority (RA) that verifies the identity of users requesting information from the certificate authority.

Network(s) 220 includes one or more networks of any type, such as, for example, a telecommunications network (e.g., a Public Switched Telephone Network (PSTN) or Public Land Mobile Network (PLMN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

In one implementation, authenticating node(s) 105 may reside in network 220, such as, for example, within the Internet. In another implementation, authenticating node (s) 105 may include one or more nodes in a PLMN 225 to which mobile devices 100 connect via wireless links. For example, as shown in FIG. 2, authenticating node(s) 105 resides within PLMN 225, where authenticating node(s) 105 may include a mobility management entity (MME) 240, a home subscriber server (HSS) 230, and/or an authentication center 235 of PLMN 225. Authentication center 235 may, in one implementation, be implemented by HSS 230 instead of implemented as a separate network node. Mobility management entity (MME) 240 may, in addition to known functions performed by MMEs within PLMN 225, engage in certain operations associated with the exemplary process of FIG. 7 below. HSS 230 and/or authentication center 235 may, in addition to known functions performed by such nodes in PLMN 225, engage in certain operations as described with respect to the exemplary process of FIG. 7 below.

The configuration of the components of network environment 200 depicted in FIG. 2 is for illustrative purposes only. It should be understood that other configurations may be implemented. Therefore, network environment 200 may include additional, fewer and/or different components, that may be configured differently, than depicted in FIG. 1.

Figure 3:
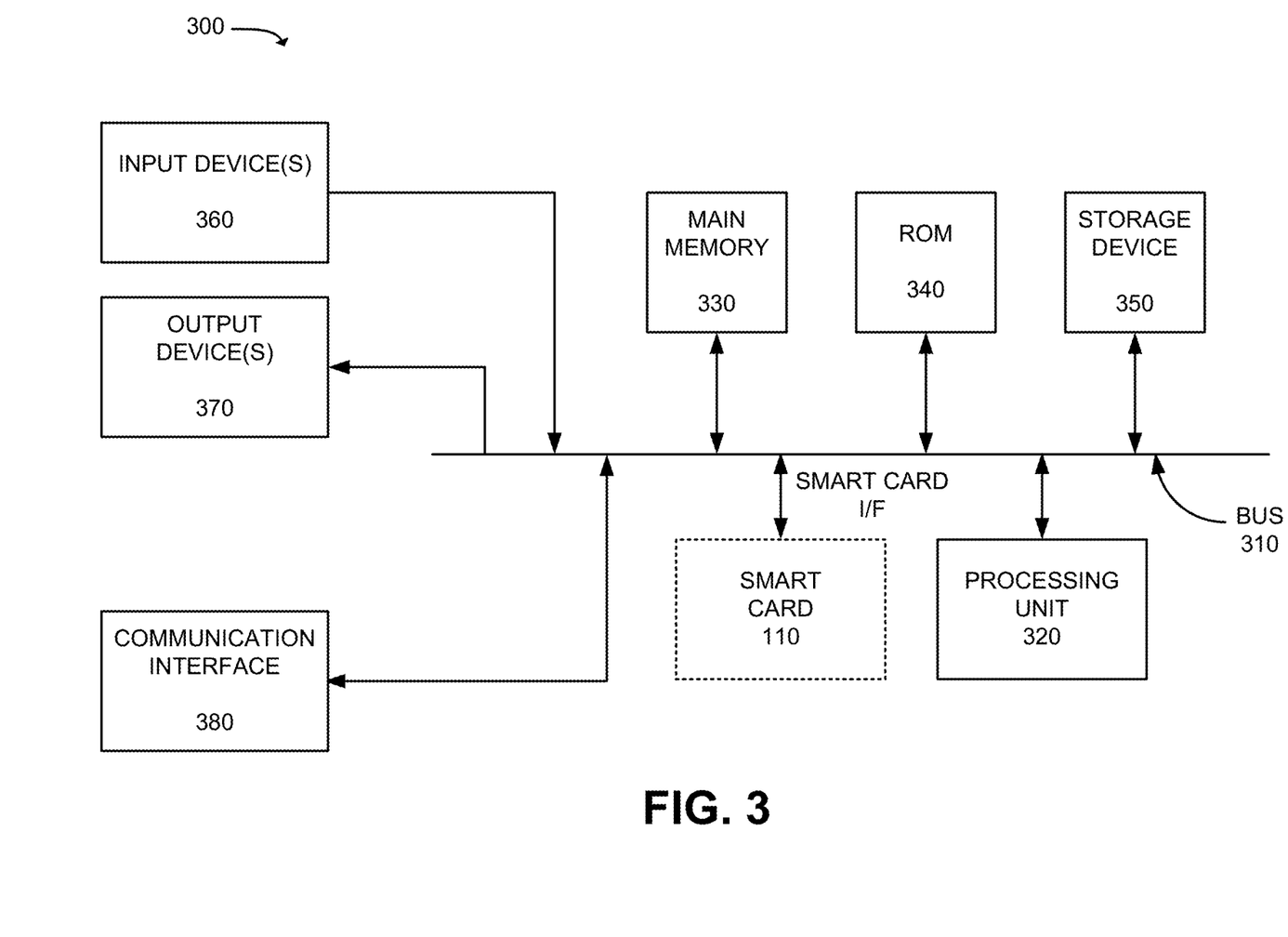
FIG. 3 is a diagram of exemplary components of a device that may correspond to the mobile devices, certificate authority, authenticating node(s), Public Key Infrastructure node(s), Mobility Management Entity, Home Subscriber Server, and/or authentication center of FIG. 2.

FIG. 3 is a diagram of exemplary components of a device 300. Mobile devices 100, certificate authority 205, authenticating node(s) 105, PKI node(s) 210, MME 240, HSS 230 and authentication center 235 may each include the same, or similar components, in a same or similar configuration to that depicted in FIG. 3. Device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of device 300. As further shown in FIG. 3, in the case of device 300 being mobile device 100, smart card 110 may be inserted into a smart card interface (I/F) of mobile device 100 that connects to bus 310.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include one or more mechanisms that permit a user or operator to input information to device 300, such as, for example, a keypad or a keyboard, a display with a touch sensitive panel, voice recognition and/or biometric mechanisms, etc. Output device 370 may include one or more mechanisms that output information to the operator or user, including a display, a speaker, etc. Input device 360 and output device 370 may, in some implementations, be implemented as a graphical user interface (GUI) that displays GUI information and which receives user input via the GUI. Communication interface(s) 380 may include one or more transceivers that enable device 300 to communicate with other devices and/or systems. For example, communication interface(s) 380 may include wired and/or wireless transceivers for communicating via network(s) 220. If device 300 is a mobile device 100, then communication interface(s) 380 includes a wireless transceiver for communicating via PLMN 225.

Device 300 may perform certain operations or processes, as may be described in detail below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices. Main memory 330, ROM 340, and storage device 350 may each be referred to herein as a "tangible non-transitory computer-readable medium."

The software instructions may be read into main memory 330 from another computer-readable medium, such as storage device 350, or from another device via communication interface 380. The software instructions contained in main memory 330 may cause processing unit 320 to perform operations or processes that will be described later. Alternatively, hardwired circuitry may be used in place of or in combination with software instructions to implement processes described herein. Thus, exemplary implementations are not limited to any specific combination of hardware circuitry and software.

The configuration of components of device 300 illustrated in FIG. 3 is for illustrative purposes only. It should be understood that other configurations may be implemented. Therefore, device 300 may include additional, fewer and/or different components, arranged in a different configuration, than depicted in FIG. 3.

Figure 4:
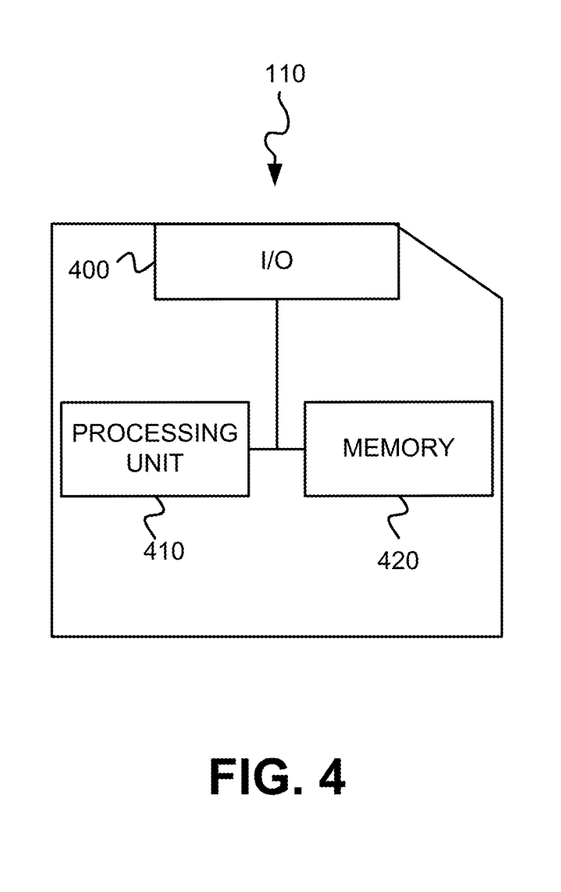
FIG. 4 is a diagram that depicts exemplary components of a smart card of FIGS. 1 and 2.

FIG. 4 is a diagram that depicts exemplary components of smart card 110. Smart card 110 may include input/output circuitry 400, a processing unit 410, and a memory 420. Smart card 110 may additionally include a digital clock circuit (not shown) that is used for clocking processing unit 410, memory 420 and/or input/output circuitry 400. The digital clock circuit may include a certain clock rate where the clock cycles of the clock circuit occur at the certain clock rate. For example, the clock circuit may have a clock rate of one hundred thousand clock cycles per second (100 KHz).

Input/output circuitry 400 may include circuitry for inputting data to smart card 110 from mobile device 100 (e.g., via bus 310), and output circuitry for outputting data from smart card 110 to mobile device 100 (e.g., via bus 310). Processing unit 410 may include a processor, microprocessor, or processing logic that may interpret and execute instructions. Memory 420 may include RAM, ROM, and/or Electrically Erasable Programmable Read-Only Memory (EEPROM) that may store data, and may store instructions for execution by processing unit 410.

Smart card 110 may perform certain operations or processes, as described herein. Smart card 110 may perform these operations in response to processing unit 410 executing software instructions contained in a non-transitory computer-readable medium, such as memory 420. For example, processing unit 410 may execute instructions for performing some or all of the blocks of the exemplary process of FIG. 7.

The configuration of components of smart card 110 illustrated in FIG. 4 is for illustrative purposes only. It should be understood that other configurations may be implemented. Therefore, smart card 110 may include additional, fewer and/or different components, arranged in a different configuration, than depicted in FIG. 4.

Figure 5:
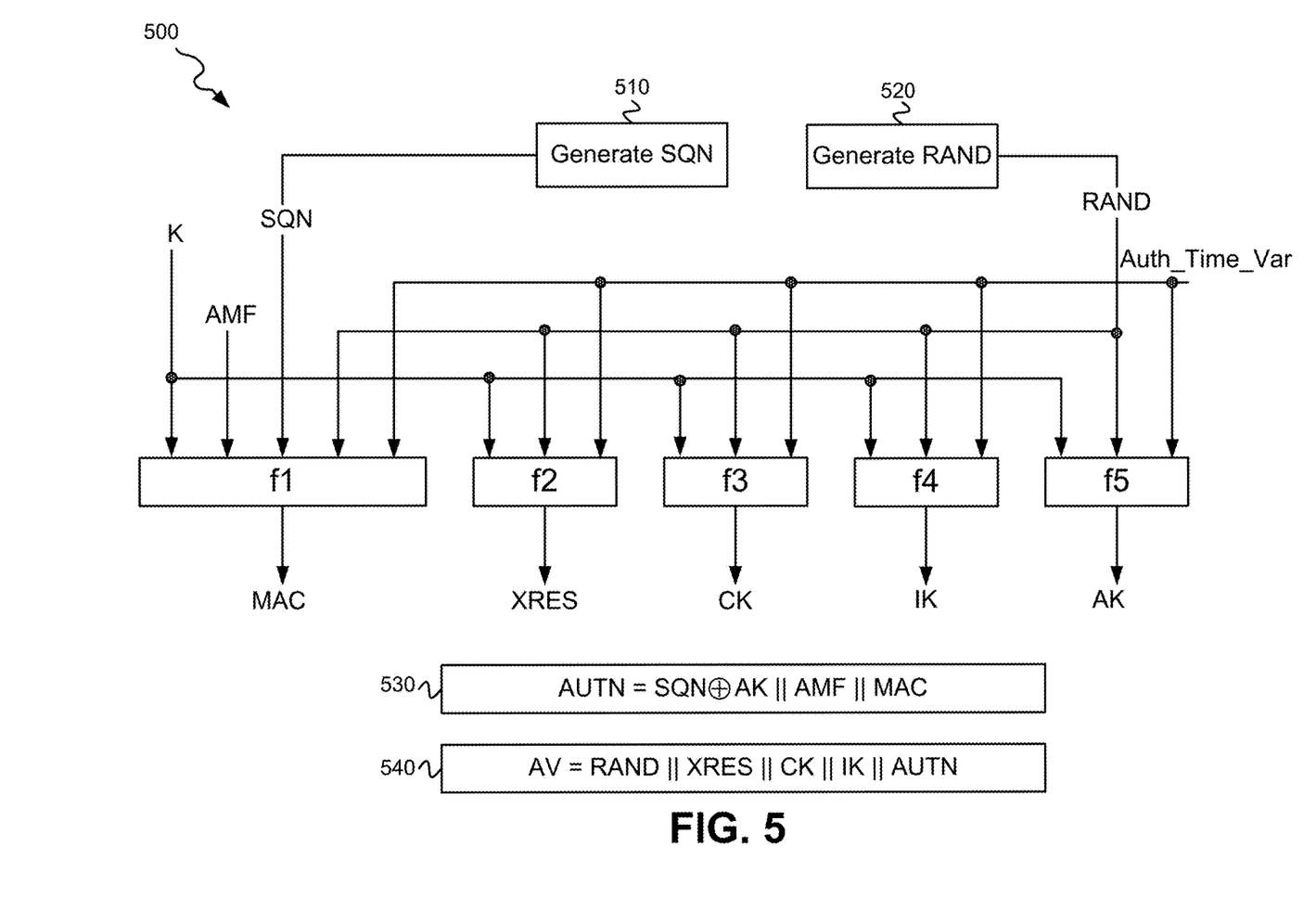
FIG. 5 is a diagram that depicts exemplary network-side cryptographic operations implemented by the authenticating node(s) of FIGS. 1 and 2.

FIG. 5 depicts exemplary network-side cryptographic operations 500 implemented by authenticating node(s) 105. Authenticating node(s) 105 obtains a security key (K), pre-shared between mobile device 100 and authenticating node(s) 105, and generates various authentication keys and values using different cryptographic functions f1-f5. In some implementations, the cryptographic functions f1-f5 may include known cryptographic functions used in existing authentication and key agreement (AKA) processes. In other implementations, the cryptographic functions f1-f5 may include the known cryptographic functions used in existing AKA processes, with modification of the cryptographic functions to accept the authentication time variable (Auth_Time_Var) as one of the function input values.

As shown in FIG. 5, authenticating node(s) 105 generates 510 a sequence number (SQN) value, where the sequence number value is regenerated for the mobile device 100 each time that the mobile device 105 is re-authenticated. Various algorithms may be used by authenticating node(s) 105 to generate the sequence number (SQN). In some implementations, each generated sequence number for each mobile device 100 increases relative to the previous sequence number (i.e., $SQN_{t+1} > SQN_t$). Authenticating node(s) 105 further generates 520 a random number value (RAND). Various algorithms may be used by authenticating node(s) 105 to generate the random number value (RAND). In one implementation, a pseudo-random number generating algorithm may be used to generate the random number value (RAND).

Authenticating node(s) 105 uses cryptographic functions f1-f5 for generating a Message Authentication Code (MAC), an expected challenge response value (XRES), a cipher key (CK), an integrity key (IK), and an anonymity key (AK).

Authenticating node(s) 105 uses a network authentication cryptographic function f1 to generate the MAC value, a user authentication cryptographic function f2 to generate the XRES value, a cipher key derivation cryptographic function f3 to generate the CK key, an integrity key derivation cryptographic function f4 to generate the IK key, and an anonymity key derivation cryptographic function f5 to generate the AK key.

The input values to function f1 include an authentication management field (AMF) value pre-stored in authenticating node(s) 105, the security key (K), the sequence number (SQN), and the random number (RAND). The input values to function f2 include the security key (K), and the random number (RAND). The input values to function f3 include the security key (K), and the random number (RAND). The input values to function f4 include the security key (K), and the random number (RAND). The input values to function f5 include the security key (K), and the random number (RAND). In the implementation shown in FIG. 5, the authentication time variable (Auth_Time_Var) may further be an input value to each of cryptographic functions f1-f5.

Once the MAC, XRES, CK, IK and AK values or keys have been generated using the cryptographic functions f1-f5, authenticating node(s) 105 generates 530 an authentication token (AUTN) based on SQN, AK, AMF, and MAC. In one implementation, AUTN may be generated in accordance with the following:

$$AUTN = SQN \oplus AK \| AMF \| MAC \qquad \text{Eqn. (1)}$$

where "$\oplus$" represents an exclusive-OR operation and "$\|$" represents adjacent concatenation of digital bits.

Authenticating node(s) 105 further generates 540 an authentication vector (AV) based on RAND, XRES, CK, IK, and AUTN. In one implementation, the authentication vector (AV) may be generated in accordance with the following:

$$AV = RAND \| XRES \| CK \| IK \| AUTN \qquad \text{Eqn. (2)}$$

The AUTN and/or the AV may be sent by authenticating node(s) 105 to mobile device 100 in an authentication challenge message.

Figure 6:
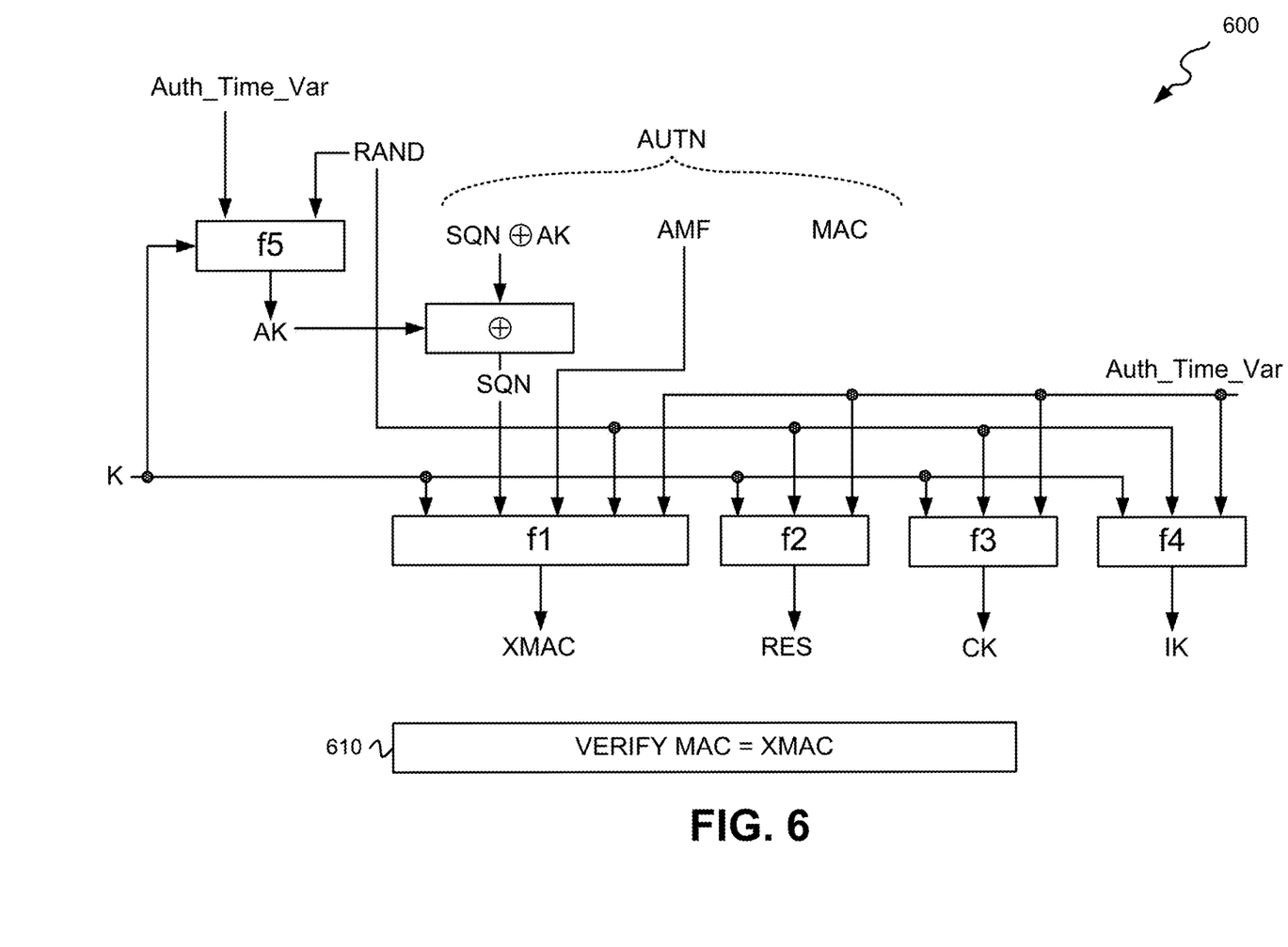
FIG. 6 is a diagram that depicts exemplary mobile device-side cryptographic operations implemented by a smart card of a mobile device of FIGS. 1 and 2.

FIG. 6 depicts exemplary mobile device-side cryptographic operations 600 implemented by smart card 110 of mobile device 100. Smart card 110 obtains the security key (K), pre-shared between mobile device 100 and authenticating node(s) 105, and generates various authentication keys and values using the different cryptographic functions f1-f5 and using the random number (RAND) and authentication token (AUTN) received from authenticating node(s) 105 in the authentication challenge message. In some implementations, the cryptographic functions f1-f5 may include the known cryptographic functions used in existing authentication and key agreement (AKA) processes. The cryptographic functions f1-f5 include the cryptographic functions that were used for the exemplary network-side cryptographic operations 500 implemented by authenticating node(s) 105, as shown in FIG. 5. In other implementations, the cryptographic functions f1-f5 may include the known cryptographic functions using in existing AKA processes, with modification of the cryptographic functions to accept the authentication time variable (Auth_Time_Var) as one of the function input values.

As shown in FIG. 6, smart card 110 uses the anonymity key derivation cryptographic function f5 for generating the anonymity key (AK). The input values to function f5 include the security key (K), and the random number (RAND) received from authentication node(s) 105. In the implementation shown in FIG. 6, the authentication time variable (Auth_Time_Var) may further be an input value to function f5. An Exclusive-OR function ($\oplus$) may receive the anonymity key (AK), generated as an output by cryptographic function f5, and the SQN$\oplus$AK value split apart from the concatenated authentication token value (AUTN) received from authenticating node(s) 105. The Exclusive-OR function ($\oplus$) recovers the sequence number (SQN) from the authentication token (AUTN) by Exclusive-ORing the SQN$\oplus$AK value with the anonymity key (AK).

Smart card 110 uses the network authentication cryptographic function f1 to generate an expected Message Authentication Code (XMAC) value, the user authentication cryptographic function f2 to generate a challenge response (RES), the cipher key derivation cryptographic function f3 to generate a cipher key (CK), and the integrity key derivation cryptographic function f4 to generate the integrity key (IK).

The input values to function f1 include the authentication management field (AMF) value split from the concatenated authentication token received from authenticating node(s) 105, the recovered sequence number (SQN), the security key (K), and the random number (RAND) received from the authenticating node(s) 105. The input values to function f2 include the security key (K), and the received random number (RAND). The input values to function f3 include the security key (K), and the received random number (RAND). The input values to function f4 include the security key (K), and the received random number (RAND). In the implementation shown in FIG. 6, the authentication time variable (Auth_Time_Var) may further be an input value to each of functions f1-f5. The RES value, and the CK and IK keys may be returned to authenticating node(s) 105 in the authentication response message from smart card 110.

Smart card 110 further splits the MAC value from the concatenated authentication token (AUTN) received from authenticating node(s) 105. Smart card 110 compares the MAC value from the authentication token (AUTN) with the expected MAC (XMAC) value generated by smart card 110. If the MAC value equals the XMAC value, then smart card 110 considers the authentication challenge message received from authenticating node(s) 105, and the authentication time variable (Auth_time_Var) contained within the message, to be authenticated and valid. If the MAC value does not equal the XMAC value, then smart card 110 considers the authentication challenge message, and the authentication time variable contained within the message, to have failed authentication and to be invalid.

Figure 7:
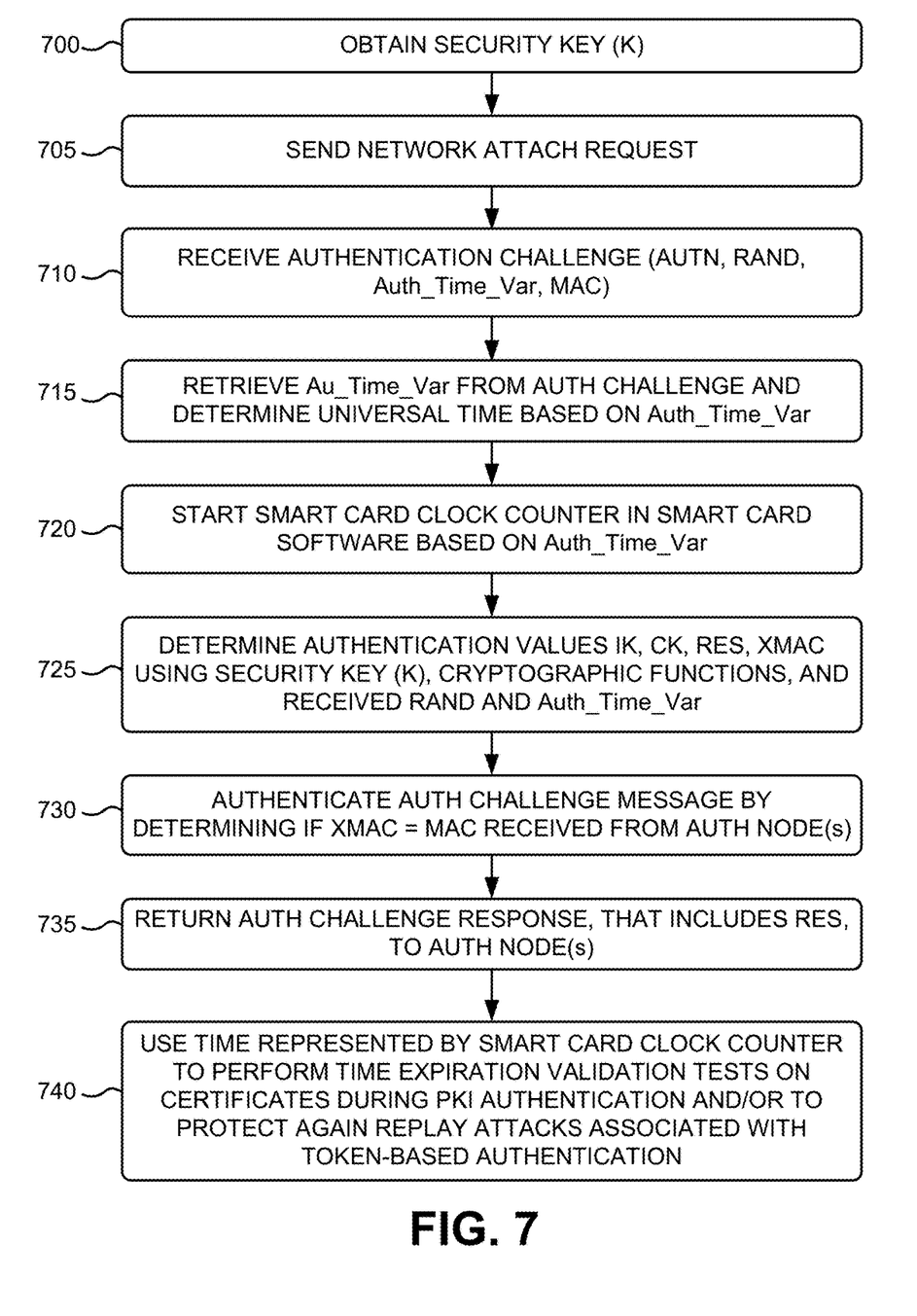
FIG. 7 is a flow diagram illustrating an exemplary process for receiving an authentication time value from a network node, and using that authentication time value to generate a local time at a smart card.

FIG. 7 is a flow diagram illustrating an exemplary process for receiving an authentication time value from a network node, and using that authentication time value to generate a local time at a smart card 110 that further may be used during PKI certificate and/or token-based authentication at the smart card 110 for determining time expirations. The exemplary process of FIG. 7 may be implemented by mobile device 100 and smart card 110. The exemplary process of FIG. 7 is described with reference to the exemplary messaging diagram of FIG. 8.

Figure 8:
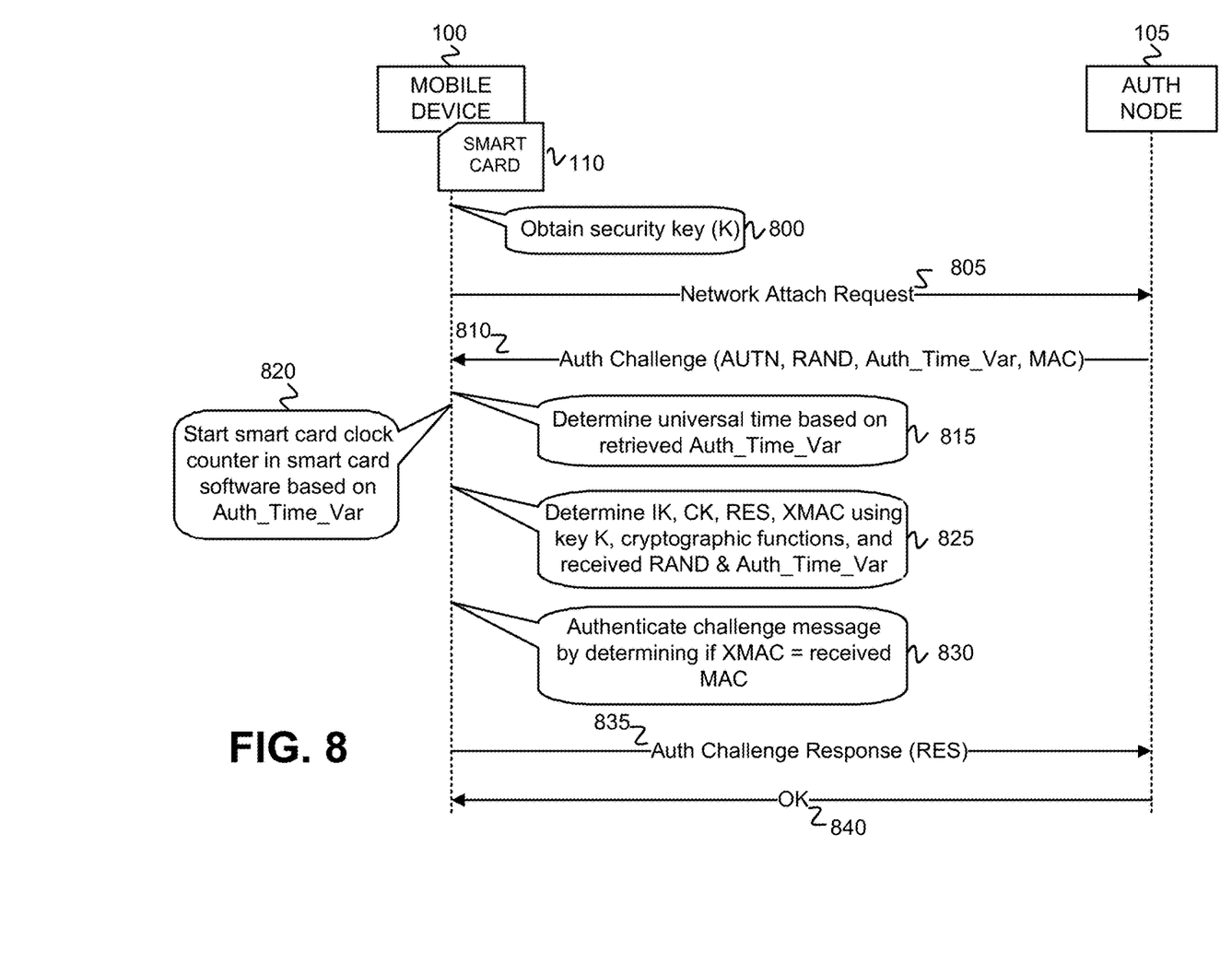
FIGS. 8 and 9 are diagrams associated with the exemplary process of FIG. 7.

The exemplary process may include smart card 110 obtaining a security key (K) (block 700). The security key K has previously been shared between mobile device 100 and authenticating node(s) 105, and stored in memory 420 of smart card 110. Various different encryption key generation algorithms may be used for generating the security key K. FIG. 8 depicts smart card 110 of mobile device 100 obtaining 800 the security key (K). Mobile device 100 sends a network attach request to PLMN 225 (block 705). Mobile device 100 may send a network attach request to PLMN 225 upon, for example, initial power-up of mobile device 100. FIG. 8 depicts mobile device 100 sending a network attach request message 805 to authenticating node(s) 105.

Smart card 110 receives an authentication challenge from authenticating node(s) 105 that includes an authentication token (AUTN), a random number (RAND), an authentication time variable (Auth_Time_Var), and a MAC (block 710). The AUTN, RAND, Auth_Time_Var, and MAC may be obtained or generated by authenticating node(s) 105 as described, for example, with respect to FIG. 5 above. FIG. 8 depicts authenticating node(s) 105 sending an authentication challenge message 810, where the message 810 includes AUTN, RAND, Auth_Time_Var, and MAC.

Figure 9:
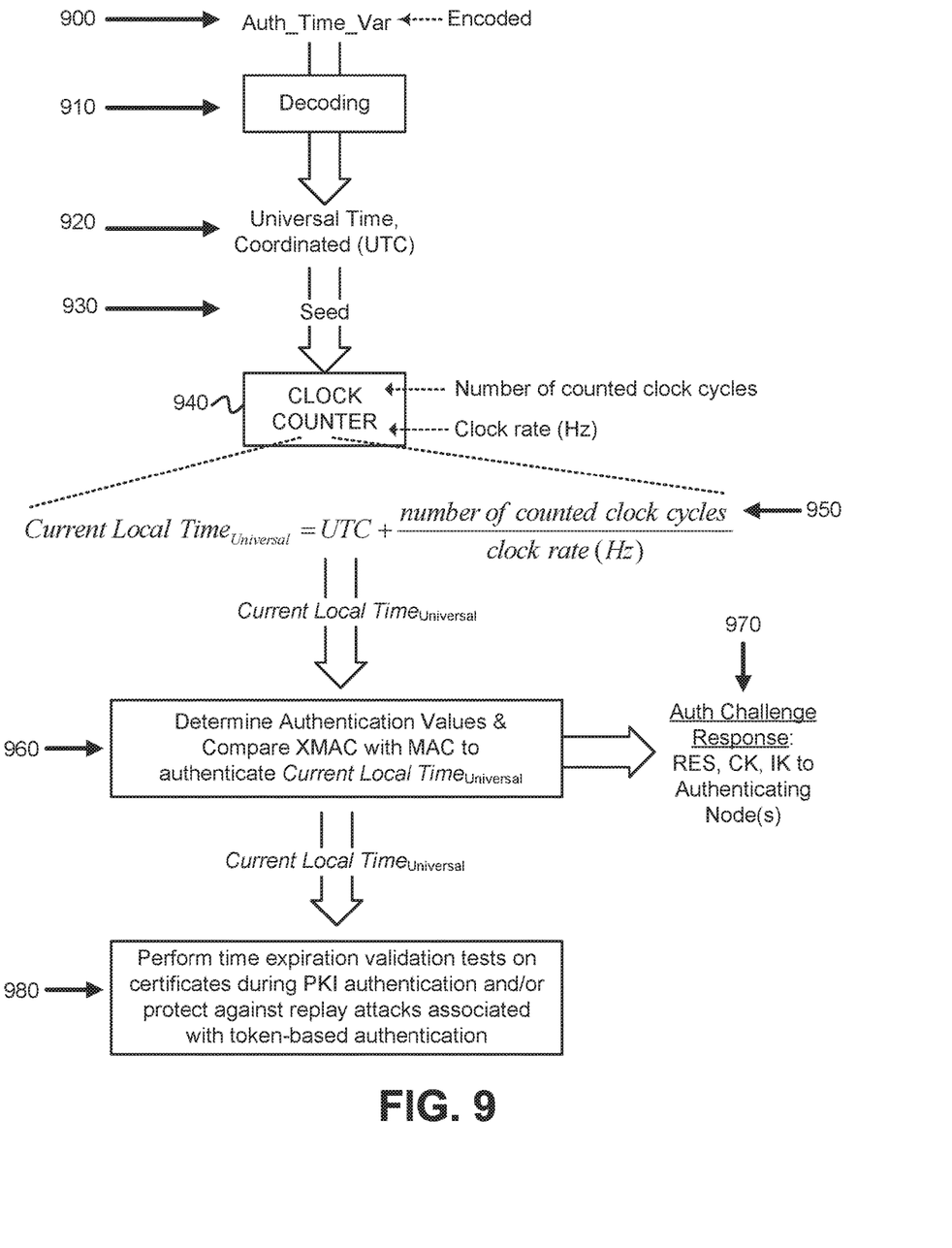

Smart card 110 retrieves the authentication time variable (Auth_Time_Var) from the authentication challenge and determines a universal time based on the authentication time variable (block 715). The determined universal time may include the "Universal Coordinated Time" (UTC) in the format of HR:MI:SE, where "HR" represents the hour during a 24 hour day, "MI" represents minutes within a range of 0 to 60 minutes, and "SE" represents seconds within a range of 0 to 60 seconds. The determined universal time may additionally include a date in, for example, a format of YR-MO-DY, where "YR" represents the year, "MO" represents the month, and "DY" represents the day of the month. Authenticating node(s) 105 may use a method of encoding the UTC, and the corresponding date, to reduce the data content and to simplify the representation of the data as sent via the authentication challenge. Smart card 110 may use a counterpart method of decoding the received Auth_Time_Var to recover the UTC, and the corresponding date, from the encoded authentication time variable (Auth_Time_Var) received via the authentication challenge from authenticating node(s) 105. As shown in FIG. 9, an encoded authentication time variable (Auth_Time_Var) 900 may be received at smart card 110 (not shown), and then decoded 910 to retrieve the universal time UTC 920 in, for example, the "HR:MI:SE" format. FIG. 8 depicts smart card 110 of mobile device 100 determining 815 a universal time based on Auth_time_Var retrieved from authentication challenged message 810.

Smart card 110 starts a smart card clock counter in smart card software based on the received authentication time variable (block 720). The clock counter may count the execution of the clock cycles of the clock circuit of smart card 110 and, based on knowledge of the clock rate or speed of the clock counter, can determine the passage of time in seconds. The clock counter may be seeded, or initialized, with the universal time determined in block 715. For example, if a universal time of 04:25:35 is determined based on the received Auth_Time_Var received in the authentication challenge, then the passage of time, determined by counting the execution of the clock cycles of the clock counter, may be added to the universal time to determine the current local time at smart card 110. As an example, if 200 million clock cycles have been counted by the clock counter of smart card 110 subsequent to receipt of Auth_Time_Var, and the clock rate of the clock circuit is known to be 100 KHz, then 200,000,000/100,000=2,000 seconds passage of time, and the current time is 04:25:35+2,000 seconds=04:25:35+33 minutes and 20 seconds=04:58:55 current universal time. The current universal time calculated based on the authentication time variable and the smart card clock counter does not necessarily represent a real time value, but is an approximation of the universal time (UTC). There may be a time window between authentications where the calculated current time becomes out-of-sync at smart card 110. However, network authentication of mobile device 100 typically occurs quite often (e.g., several times a day) so as to ensure a sufficient accuracy in the calculated universal time as to be adequate for PKI and token authentication. FIG. 9 shows a clock counter 940 being seeded 930 by the decoded universal time UTC 920. The clock counter 940 counts the number of clock cycles subsequent to receipt of the authentication time variable, and determines a current local time 950 (Current Local Time$_{Universal}$) based on the clock rate and the following:

$$\text{Current Local Time} = UTC + \frac{\text{number of counted clock cycles}}{\text{clock rate (Hz)}} \quad \text{Eqn. (3)}$$

FIG. 8 depicts smart card 110 starting 820 a smart card clock counter in software based on the received authentication time variable (Auth_Time_Var).

Smart card 110 determines authentication keys and values IK, CK, RES, and XMAC using the security key (K), cryptographic functions f1-f5, the received random number RAND and the received authentication time variable (Auth_Time_Var) (block 725). For example, smart card 110 determines IK, CK, RES and XMAC as described above with respect to FIG. 6. FIG. 8 depicts smart card 110 of mobile device 100 determining 825 authentication keys and values IK, CK, RES and XMAC using the security key K, cryptographic functions f1-f5, the received random number RAND and the authentication time variable (Auth_Time_Var).

Smart card 110 authenticates the received authentication challenge by determining if the determined XMAC value equals the received MAC value (block 730). Smart card 110 compares the MAC value extracted from the authentication token (AUTN) received from authenticating node(s) 105 with the expected MAC (XMAC) value generated by smart card 110. If the MAC value equals the XMAC value, then smart card 110 considers the authentication challenge message received from authenticating node(s) 105, and the authentication time variable (Auth_time_Var) contained within the message, to be authenticated and valid. If the MAC value does not equal the XMAC value, then smart card 110 considers the authentication challenge message, and the authentication time variable contained within the message, to have failed authentication and to be invalid. FIG. 8 depicts smart card 110 of mobile device 100 authenticating 830 the challenge message 810 by determining if XMAC is equal to the received MAC. FIG. 9 further illustrates the determination 960 of the authentication values and comparison of the determined XMAC with MAC to authenticate the Current Local Time$_{Universal}$ 950.

Smart card 110 returns an authentication challenge response, that includes the authentication response value (RES), to authenticating node(s) 105 (block 735). The authentication challenge response may additionally include the IK and CK keys, as generated as described with respect to FIG. 6 above. Smart card 110 inserts the authentication response value RES, determined in block 725, into the outgoing authentication challenge response message and returns the authentication challenge response message to authenticating node(s) 105. FIG. 8 depicts smart card 110 of mobile device 100 sending an authentication challenge response message 835, which includes the authentication response value (RES), to authenticating node(s) 105. FIG. 9 further illustrates the authentication challenge response 970, which includes RES, CK and IK, being sent to the authenticating node(s) based on the comparison 960 of XMAC and MAC to authenticate the authentication challenge and the time variable Auth_time_Var included with the authentication challenge. In response to receipt of response message 835, authenticating node(s) 105 may return an "OK" acknowledgement message 840 to mobile device 100.

Smart card 110 subsequently uses time, represented by the smart card clock counter, to perform time expiration validation tests on certificates during PKI authentication and/or to protect against replay attacks associated with token-based authentication (block 740). Various different authentication algorithms may be used for verifying the authenticity of network nodes in network 220, including using PKI certificates and/or authentication tokens. When smart card 110 is performing authentication based on PKI certificates, smart card 110 may perform time expiration validation tests of PKI certificates by further making use of a local current time generated based on the smart card clock counter (refer to block 720 above). When smart card 110 is performing authentication based on authentication tokens, smart card 110 may protect against replay attacks by using its accurate local current time based on the smart card clock counter. FIG. 9 depicts performance 980 of time expiration validation tests, on certificates during PKI authentication and/or to protect against replay attacks associated with token-based authentication, using the Current Local Time$_{Universal}$ 950. The exemplary process of FIG. 7 may be repeated for each network attach request sent from a mobile device 100 to network 220.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 7, and message flows with respect to FIG. 1 or 8, the order of the blocks and/or message flows may be varied in other implementations. Delivery of the authenticated time variable (Auth_Time_Var) has been described herein as occurring during an authentication process, where Auth_Time_Var is included within an authentication challenge sent from authenticating node(s) 105 to mobile device 100. In other implementations, Auth_Time_Var may be delivered from a node in network 220 or 225 in device polling messages sent at regular intervals, or sent asynchronously on-demand. For example, a node in a PLMN 225 may send a status polling command message, requesting a status of mobile device 100, to mobile device 100, and may include the Auth_Time_Var within the polling message. Other types of device polling messages may be sent by network 220 or PLMN 225 and may include the Auth_Time_Var. Upon receipt of the Auth_Time_Var within the device polling message, smart card 110 of mobile device 100 may determine the universal time, and start the smart card clock counter, as described with respect to blocks 715 and 720 of FIG. 7, and may use locally calculated universal time values as described with respect to block 740 of FIG. 7.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such.

Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    sending, from a mobile device, a network attach request to a network node;
    receiving, at the mobile device, an authentication challenge from the network node, wherein the authentication challenge includes an authentication token, a random number, a time variable associated with a first current time at the network node, and a message authentication code (MAC), wherein the time variable includes an encoded version of the first current time;
    retrieving, by a microprocessor smart card of the mobile device, the time variable from the authentication challenge;
    determining the first current time from the time variable by decoding the encoded version of the first current time;
    starting, by the microprocessor smart card, a clock counter to count a number of clock cycles;
    determining, by the microprocessor smart card, a second current time based on the number of clock cycles, a clock rate of the clock counter, and the determined first current time;
    authenticating, by the microprocessor smart card, the authentication challenge based on the MAC;
    returning, by the microprocessor smart card, an authentication challenge response to the network node based on the authentication of the MAC; and
    using, by the microprocessor smart card at the mobile device based on the authentication of the MAC, the determined second current time to perform time expiration validation tests during authentication of received Public Key Infrastructure (PKI) certificates and/or received authentication tokens.

2. The method of claim 1, wherein the determined first current time comprises a universal time, and
    wherein determining the second current time comprises:
    seeding or initiating, by the microprocessor smart card, the clock counter with the universal time.

3. The method of claim 1, further comprising:
obtaining, by the microprocessor smart card, a security key; and
determining, by the microprocessor smart card, one or more authentication values or keys using the security key, one or more cryptographic functions, the received random number and the encoded version of the first current time.

4. The method of claim 3, wherein the one or more authentication values or keys further includes an expected message authentication code (XMAC) and wherein the MAC is generated by the network node.

5. The method of claim 4, wherein authenticating the authentication challenge further comprises:
authenticating, by the microprocessor smart card, the authentication challenge by comparing the XMAC with the MAC.

6. The method of claim 5, wherein the one or more authentication values or keys include a challenge response value (RES), and wherein the authentication challenge response includes the challenge response value RES.

7. The method of claim 1, wherein the microprocessor smart card comprises one of a Universal Integrated Circuit Card (UICC), a removable user identity module (R-UIM) card, or a subscriber identity module (SIM).

8. A device, comprising:
a processing unit, or logic;
a communication interface connected to a network and configured to:
send a network attach request to a network node in the network, and
receive an authentication challenge from the network node, wherein the authentication challenge includes an authentication token, a random number, a time variable associated with a first current time at the network node, and a message authentication code (MAC), wherein the time variable includes an encoded version of the first current time; and
a microprocessor smart card that couples with the processing unit, or the logic, and is configured to:
retrieve the time variable from the authentication challenge;
determine the first current time from the time variable by decoding the encoded version of the first current time;
start a clock counter in the microprocessor smart card to count a number of clock cycles;
determine a second current time based on the number of clock cycles, a clock rate of the clock counter, and the determined first current time;
authenticate the authentication challenge based on the MAC;
return, via the communication interface to the network node, an authentication challenge response based on the authentication of the MAC; and
use, based on the authentication of the MAC, the determined second current time to perform time expiration validation tests during authentication of received Public Key Infrastructure (PKI) certificates and/or received authentication tokens.

9. The device of claim 8, wherein the microprocessor smart card comprises one of a Universal Integrated Circuit Card (UICC), a removable user identity module (R-UIM) card, or a subscriber identity module (SIM).

10. The device of claim 8, wherein the determined first current time comprises a universal time and wherein, when determining the second current time, the microprocessor smart card is further configured to:
seed or initialize the clock counter with the universal time.

11. The device of claim 8, wherein the microprocessor smart card is further configured to:
obtain a security key, and
determine one or more authentication values or keys using the security key, one or more cryptographic functions, the received random number and the encoded version of the first current time.

12. The device of claim 11, wherein the one or more authentication values or keys further includes an expected message authentication code (XMAC), wherein the MAC is generated by the network node, and wherein, when authenticating the authentication challenge, the microprocessor smart card is further configured to:
authenticate the authentication challenge by comparing the XMAC with the MAC.

13. The device of claim 12, wherein the one or more authentication values or keys includes a challenge response authentication value (RES) and wherein the the authentication challenge response includes the challenge response authentication value RES.

14. A non-transitory storage medium storing instructions executable by a microprocessor smart card, wherein the instructions comprise instructions to cause the microprocessor smart card to:
receive, from a network authentication node responsive to a network attach request, an authentication challenge, wherein the authentication challenge includes an authentication token, a random number, a time variable associated with a first current time at the network authentication node, and a message authentication code (MAC), wherein the time variable includes an encoded version of the first current time;
retrieve the time variable from the authentication challenge;
determine the first current time from the time variable by decoding the encoded version of the first current time;
start a clock counter in microprocessor smart card software to count a number of clock cycles;
determine a second current time based on the number of clock cycles, a clock rate of the clock counter, and the determined first current time;
authenticate the authentication challenge based on the MAC;
return, to the network node, an authentication challenge response based on the authentication of the MAC; and
use, based on the authentication of the MAC, the determined second current time to perform time expiration validation tests during authentication of received Public Key Infrastructure (PKI) certificates and/or received authentication,
wherein the microprocessor smart card comprises one of a Universal Integrated Circuit Card (UICC), a removable user identity module (R-UIM) card, or a subscriber identity module (SIM).

15. The non-transitory storage medium of claim 14, wherein the determined first current time comprises a universal time and wherein the instructions comprise instructions to cause the microprocessor smart card to:
seed or initialize, by the microprocessor smart card, the clock counter with the universal time to determine the second current time.

16. The non-transitory storage medium of claim 15, wherein the instructions comprise instructions to cause the microprocessor smart card to:

obtain a security key; and determine one or more authentication values or keys using the security key, one or more cryptographic functions, the received random number and the encoded version of the first current time.

17. The non-transitory storage medium of claim 16, wherein the one or more authentication values or keys includes a challenge response authentication value (RES) and wherein the authentication challenge response includes the challenge response authentication value RES.

18. The non-transitory storage medium of claim 16, wherein the one or more authentication values or keys further include an expected message authentication code (XMAC), wherein the MAC is generated by the network node, and wherein the instructions comprise instructions to cause the microprocessor smart card to:

authenticate the authentication challenge by comparing the XMAC with the MAC.

19. The method of claim 1, wherein determining the second current time comprises using:

second current time=first current time+(number of counted clock cycles of the clock counter/clock rate (Hz) of the clock counter).

20. The device of claim 8, wherein, when determining the second current time, the microprocessor smart card is further configured to calculate the second current time using:

second current time=first current time+(number of counted clock cycles of the clock counter/clock rate (Hz) of the clock counter).

* * * * *